US012652201B2

(12) United States Patent
Lakshmikumar et al.

(10) Patent No.: US 12,652,201 B2
(45) Date of Patent: Jun. 9, 2026

(54) EQUALIZER FOR LINEAR-DRIVE PLUGGABLE OPTICS

(71) Applicant: Cisco Technology, Inc., San Jose, CA (US)

(72) Inventors: Kadaba Lakshmikumar, Hillsborough, NJ (US); Abhishek Bhat, Allentown, PA (US); Romesh Kumar Nandwana, Carlsbad, CA (US); Gary Wong, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 69 days.

(21) Appl. No.: 18/770,500

(22) Filed: Jul. 11, 2024

(65) Prior Publication Data

US 2026/0019310 A1     Jan. 15, 2026

(51) Int. Cl.
  *H04L 25/03* (2006.01)
  *H04L 25/02* (2006.01)
(52) U.S. Cl.
  CPC .... *H04L 25/03878* (2013.01); *H04L 25/0272* (2013.01); *H04L 25/03343* (2013.01)
(58) Field of Classification Search
  CPC ........... H04L 25/03878; H04L 25/0272; H04L 25/03343
  USPC ........................................................ 375/230
  See application file for complete search history.

(56) References Cited

U.S. PATENT DOCUMENTS

| | | | |
|---|---|---|---|
| 10,505,509 B2 | 12/2019 | Lakshmikumar et al. | |
| 11,489,705 B1 | 11/2022 | Casey et al. | |
| 2004/0169562 A1* | 9/2004 | Novac | H03B 5/364 |
| | | | 331/158 |
| 2015/0312684 A1* | 10/2015 | Knudsen | H04R 25/552 |
| | | | 381/23.1 |
| 2016/0226247 A1 | 8/2016 | Stratakos et al. | |
| 2019/0190505 A1 | 6/2019 | Yi et al. | |
| 2020/0153422 A1 | 5/2020 | Lee | |
| 2022/0294171 A1 | 9/2022 | Zhang et al. | |

OTHER PUBLICATIONS

Lakshmikumar K.R., et al., "A Process and Temperature Insensitive CMOS Linear TIA for 100 GB/s/A PAM-4 Optical Links", IEEE Journal of Solid-State Circuits, Nov. 2019, vol. 54, No. 11, pp. 3180-3190.
Sewter J., et al., "A 3-Tap FIR Filter With Cascaded Distributed Tap Amplifiers for Equalization Up to 40 GB/s in 0.18-um CMOS", IEEE Journal of Solid-State Circuits, Aug. 2006, vol. 41, No. 8, pp. 1919-1929.

(Continued)

*Primary Examiner* — Leila Malek
(74) *Attorney, Agent, or Firm* — Patterson + Sheridan, LLP

(57) ABSTRACT

The present disclosure describe an equalizer that implements transconductor cells using switchable inverters. The equalizer includes an input line, an output line, and a first transconductor cell. The first transconductor cell includes a first inverter electrically connected between the input line and the output line, a second inverter electrically connected between the input line and the output line, and a first switch electrically coupled to the second inverter. When the first switch closes, power is provided to the second inverter.

18 Claims, 7 Drawing Sheets

112

(56)               References Cited

OTHER PUBLICATIONS

Sewter J., et al., "A CMOS Finite Impulse Response Filter With a Crossover Traveling Wave Topology for Equalization up to 30 GB/s", IEEE Journal of Solid-state Circuits, Apr. 2006, vol. 41, No. 4, pp. 909-917.

Ye B., et al., "A Five-Tap Delay-Line-Based Feed-Forward-Equalizer for 200-GB/s Wireline Receiver in 28-nm CMOS", IEEE Journal of Solid-state Circuits, Jan. 2024, vol. 59, No. 1, pp. 19-28.

\* cited by examiner

<u>207</u>

212/214

402A

402B

210/216

EQUALIZER FOR LINEAR-DRIVE PLUGGABLE OPTICS

TECHNICAL FIELD

Embodiments presented in this disclosure generally relate to optical modules. More specifically, embodiments disclosed herein relate to equalizers for optical transceivers.

BACKGROUND

As the capacity delivered by switching chips continue to grow, the power consumption of optical transceivers has begun to exceed that of switching chips, becoming a key factor in network solutions. For example, in some existing switches, optical transceivers may represent 16% or more of the power consumed by the switches under standard operating conditions. The digital signal processor (DSP) in the transceivers, which may be used to overcome optical and electrical impairments in both long and short hauls, may account for around 50% to 70% of the power consumption of the transceiver.

To reduce power consumption and cost while providing high-speed, high-density optical communication connections, linear-drive pluggable optics (LPO) modules have emerged. LPO technology uses a linear drive approach, replacing DSPs with transimpedance amplifiers (TIAs) and drivers (e.g., drive chips) with high linearity. This design significantly reduces power consumption and latency relative to using DSPs.

Optical transceivers may include equalizers that adjust electrical signals to counteract the effects of a channel (e.g., the frequency response of the channel). It may be difficult, however, to implement an equalizer for an LPO module because an LPO module does not use a clock signal, which may inhibit the use of timing elements.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
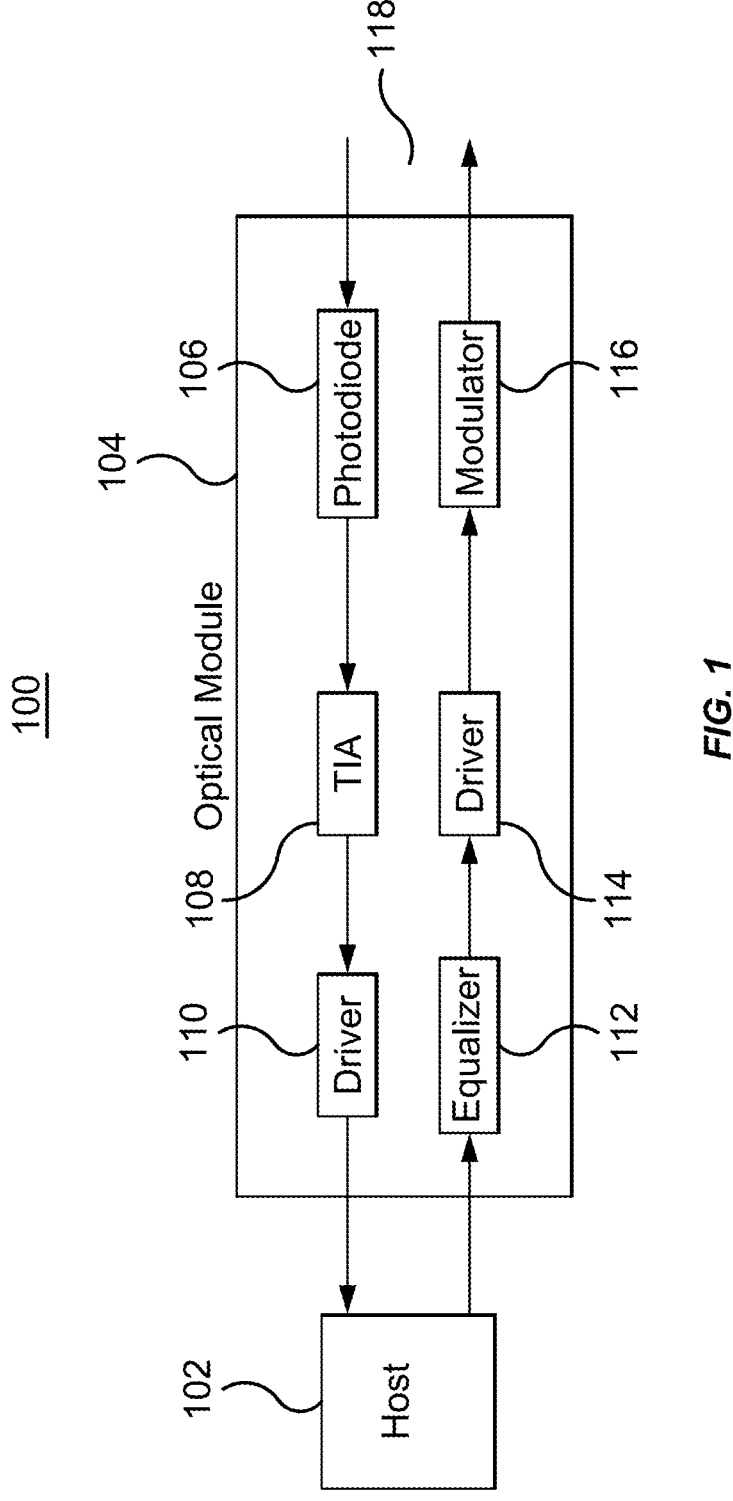
FIG. 1 illustrates an example system.

The present disclosure describes an equalizer that implements transconductor cells using switchable inverters. According to an embodiment, the equalizer includes an input line, an output line, and a first transconductor cell. The first transconductor cell includes a first inverter electrically connected between the input line and the output line, a second inverter electrically connected between the input line and the output line, and a first switch electrically coupled to the second inverter. When the first switch closes, power is provided to the second inverter.

According to another embodiment, a method includes adjusting a transconductance of a first transconductor cell of an equalizer by closing a first switch electrically coupled to a first inverter of the first transconductor cell to provide power to the first inverter. The first inverter is electrically coupled between an input line and an output line. The method also includes adjusting the transconductance of the first transconductor cell by opening the first switch to disconnect power from the first inverter. The first transconductor cell further includes a second inverter electrically connected between the input line and the output line.

According to another embodiment, an equalizer comprises an input line, an output line, a first block, and a second block. The first block implements a main cursor of the equalizer. The first block includes a first transconductor cell and a second transconductor cell. The first transconductor cell includes a first inverter electrically connected between the input line and the output line, a second inverter electrically connected between the input line and the output line, and a first switch electrically coupled to the second inverter. When the first switch closes, power is provided to the second inverter. The second transconductor cell includes a third inverter electrically connected between the input line and the output line, a fourth inverter electrically connected between the input line and the output line, and a second switch electrically coupled to the fourth inverter. When the second switch closes, power is provided to the fourth inverter. The second block implements at least one of a pre-cursor or a post-cursor. The second block includes a third transconductor cell that includes a fifth inverter electrically connected between the input line and the output line, a sixth inverter electrically connected between the input line and the output line, and a third switch electrically coupled to the sixth inverter. When the third switch closes, power is provided to the sixth inverter.

Example Embodiments

The present disclosure describes an equalizer in an LPO module that uses switchable inverters to implement transconductor cells. Generally, the equalizer implements tap weights using the transconductor cells. The equalizer adjusts the tap weight for a transconductor cell by adjusting the transconductance of that transconductor cell. To adjust the tap weight, the equalizer opens or closes switches in the transconductor cell to direct power to or away from inverters in the transconductor cell, which effectively turns on or off the inverters. By controlling which inverters are turned on and off, the equalizer adjusts the transconductance of the transconductor cell.

In certain embodiments, the equalizer presents several technical advantages. For example, the equalizer performs the equalization functions for the LPO module without using a clock signal. Additionally, the equalizer may use transconductor cells with input and output capacitances that are independent of the tap weights for the transconductor cells.

FIG. 1 illustrates an example system 100, which may be an optical system. As seen in FIG. 1, the system 100 includes a host 102, and an optical module 104. The host 102 may be in electrical communication with the optical module 104. Generally, the optical module 104 converts electrical signals from the host 102 into optical signals. Additionally, the optical module 104 converts optical signals into electrical signals for the host 102.

The host 102 may be an electronic device that connects with the optical module 104. For example, the host 102 may be a computer, a server, an access point, a router, or any other electronic device that transmits and receives electrical signals to communicate with other devices. The host 102 may provide an interface (e.g., a port) to which the optical module 104 connects. After the host 102 is connected with the optical module 104, the host 102 may communicate electrical signals to and from the optical module 104. For example, the host 102 may transmit electrical signals that include data for another device. The optical module 104 may convert those electrical signals into optical signals that include the data. The optical module 104 then transmits the optical signals towards their destination. As another example, the optical module 104 may receive an optical signal that includes data. The optical module 104 may convert the optical signal into an electrical signal that includes the data. The optical module 104 then directs the electrical signal to the host 102, and the host 102 may process the data in the electrical signals.

The optical module 104 may be an optical transceiver that converts electrical signals into optical signals and optical signals into electrical signals. For example, the optical module 104 may convert electrical signals from the host 102 to optical signals, and the optical module 104 may convert optical signals into electrical signals for the host 102. As seen in FIG. 1, the optical module 104 includes a photodiode 106, a transimpedance amplifier 108, a driver 110, an equalizer 112, a driver 114, and a modulator 116.

The photodiode 106 receives an optical signal carrying data and converts that optical signal into an electrical signal. For example, the photodiode 106 may convert a received optical signal into an electric current. The magnitude of the electric current may depend on the intensity or content of the optical signal. The transimpedance amplifier 108 converts the electric current into a voltage. The driver 110 then conditions the voltage for the host 102. The host 102 may extract data from the voltage signal from the driver 110 and process that data.

The host 102 also transmits electrical signals that carry data. For example, the host 102 may transmit electric voltages and/or current that carry data from the host 102. The equalizer 112 adjusts the electrical signal from the host 102 to mitigate impairments introduced by the optical channel 118 between the optical module 104 and another receiving device (e.g., another optical module). By mitigating the impairments, or losses introduced by the channel 118, the receiving device may correctly extract the data from the signal. In certain embodiments, the equalizer 112 adjusts electrical signals using transconductor cells implemented using switchable inverters. As a result, the equalizer 112 may perform equalization without relying on a clock signal.

The driver 114 adjusts the voltage and/or current from the equalizer 112. As a result, the driver 114 conditions the electrical signal from the equalizer 112 for the modulator 116. The modulator 116 modulates an optical signal (e.g., from an optical source such as a laser) with the data in the electrical signal from the driver 114. In this manner, the modulator 116 generates an optical signal that carries the data from the host 102. The modulator 116 transmits the generated optical signal through the optical channel 118 to the receiving device. In this manner, the optical module 104 transmits data from the host 102 as an optical signal.

In some embodiments, the equalizer 112 includes a regular, repetitive layout, and the footprint of the equalizer 112 may be the same regardless of the tap weights implemented by the equalizer. Additionally, the inverters in the equalizer 112 may use dynamic voltage scaling, which tunes out process and temperature variation.

Figure 2:
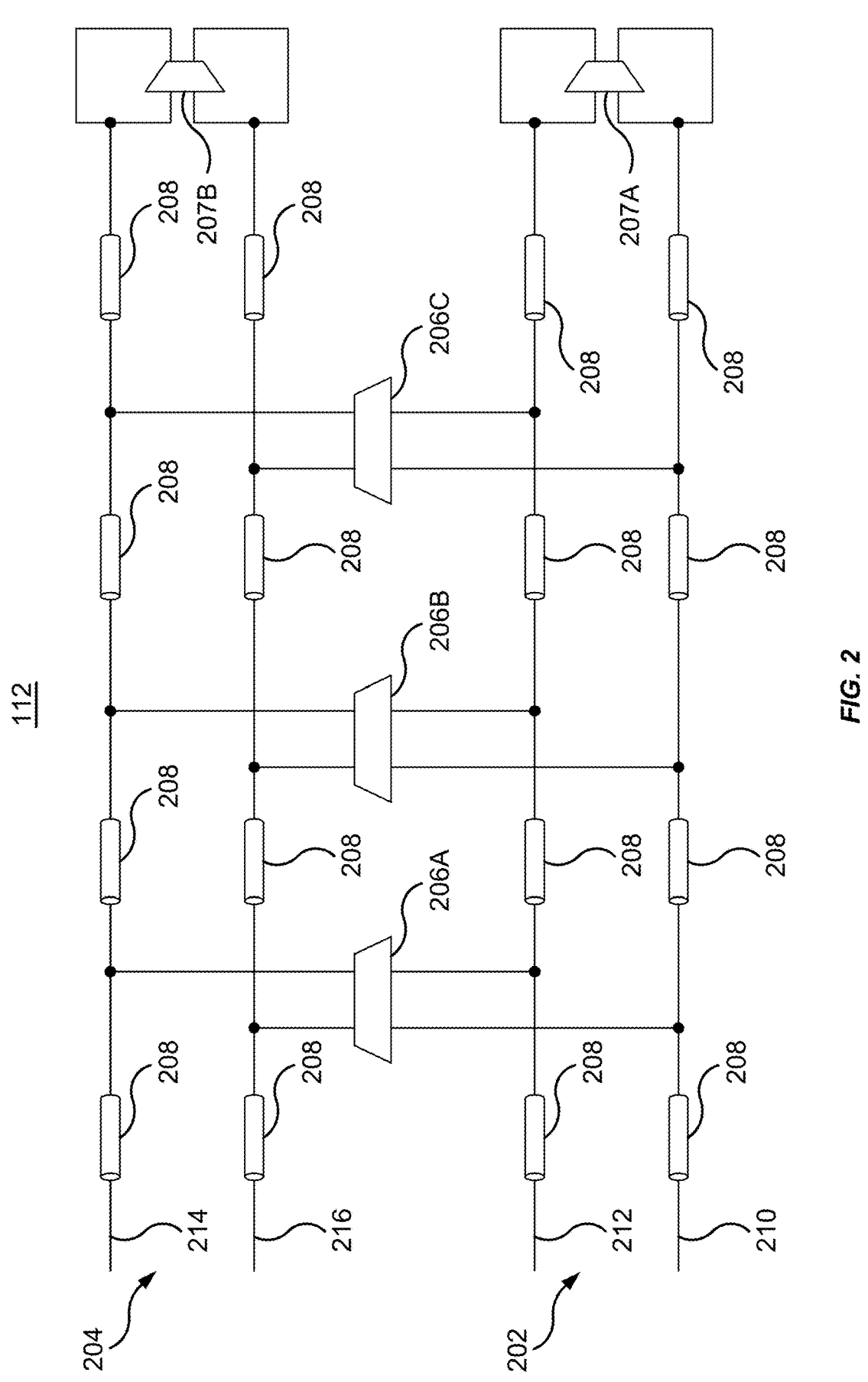
FIG. 2 illustrates an example equalizer in the system of FIG. 1.

FIG. 2 illustrates an example equalizer 112 in the system 100 of FIG. 1. As seen in FIG. 2, the equalizer 112 includes an input line 202, an output line 204, one or more transconductor cells 206, one or more transimpedance cells 207, and circuit elements 208. Generally, the equalizer 112 uses the transconductor cells 206 to implement tap weights for adjusting the electrical signal from the host 102.

In the example of FIG. 2, the input line 202 is a differential input line that includes a positive input 210 and a negative input 212. The output line 204 is a differential output line that includes a positive output 214 and a negative output 216. Generally, the input line 202 receives a differential electrical signal from the host 102, and the output line 204 outputs a differential electrical signal to the driver 114.

The transconductor cells 206 are connected to the input line 202 and the output line 204 in parallel with each other. The transconductor cells 206 implement tap weights for adjusting the electrical signal from the host 102. In the example of FIG. 2, the equalizer 112 includes the transconductor cells 206A, 206B, and 206C. Each of the transconductor cells 206A, 206B and 206C are connected to the positive input 210, negative input 212, positive output 214, and negative output 216. The transconductor cell 206B may implement a main cursor of the equalizer 112. The transconductor cell 206A may implement a precursor of the equalizer 112. The transconductor cell 206C may implement a postcursor of the equalizer 112. In certain embodiments, the transconductor cells 206A, 206B, and 206C are implemented using networks of switchable inverters. The switches may control which of the inverters are powered on or powered off. Powering on and off different inverters of the transconductor cells 206A, 206B, and 206C may adjust the tap weights provided by the transconductor cells 206A, 206B, and 206C. In some embodiments, negative tap weights may be realized by interchanging the input or output terminals of the transconductor cells 206A, 206B and/or 206C.

The equalizer 112 also includes the transimpedance cells 207A and 207B. The transimpedance cells 207A and 207B may be transconductor cells whose inputs and outputs are shorted. The current output of the transconductor cells 206A, 206B, and 206C is converted to a voltage by the transimpedance cells 207A and 207B. Similar to the transconductor cells 206A, 206B, and 206C, the transimpedance cells 207A and 207B may also be implemented using inverters. As seen in FIG. 2, the transimpedance cell 207A is connected to the positive input 210 and the negative input 212. The transimpedance cell 207B is connected to the positive output 214 and the negative output 216. The inverters in the transimpedance cells 207A and 207B are shorted across the positive input 210, negative input 212, positive output 214, and/or negative output 216. Generally, the impedance of the shorted inverters matches the impedance or characteristic impedance of the input line 202 or output line 204. The shorted inverters may also set the common mode level of the input line 202 and/or output line 204. In some embodiments, the compressive behavior of the transconductor cells 206A, 206B, and 206C may be compensated by the expansive natures of the transimpedance cells 207A and 207B. As a result, the equalizer 112 provides improved linearity over a wide voltage range.

The circuit elements 208 may be positioned at various intervals in the input line 202 and the output line 204. Each of the positive input 210, negative input 212, positive output 214, and negative output 216 may include the circuit elements 208. The circuit elements 208 may be positioned between the inputs of the transconductor cells 206A, 206B, and 206C and/or transimpedance cells 207A and 207B and between the outputs of the transconductor cells 206A, 206B, and 206C and/or transimpedance cells 207A and 207B. Each of the circuit elements 208 may include capacitors, resistors, and/or inductors that introduce delay in the line. These delays may allow the transconductor cells 206A, 206B and 206C to implement the precursor, main cursor, and postcursor of the equalizer 112, respectively, without relying on a clock signal.

Figure 3:
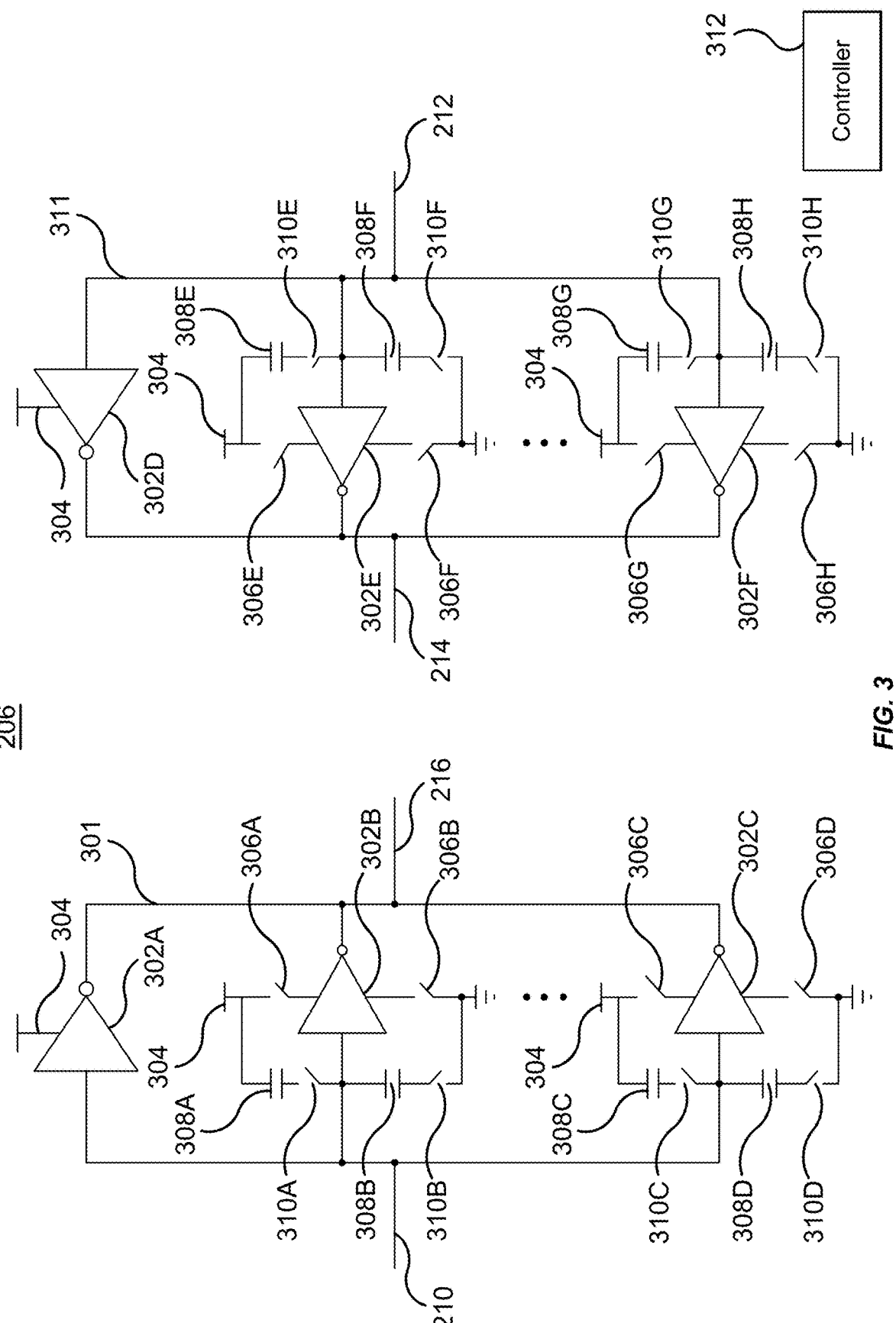
FIG. 3 illustrates an example transconductor cell of the equalizer of FIG. 2.

FIG. 3 illustrates an example transconductor cell 206 of the equalizer 112 of FIG. 2. Generally, the transconductor cell 206 shown in the example of FIG. 3 may be used as the transconductor cells 206A, 206B, and/or 206C. As seen in FIG. 3, the transconductor cell 206 implements tap weights using networks of inverters 302.

The transconductor cell 206 includes a first network 301 of inverters 302 connected between the positive input 210 and the negative output 216. This network 301 of inverters 302 may include any number of inverters 302. In the example of FIG. 3, the network 301 of inverters 302 includes the inverters 302A, 302B, and 302C. The inverter 302A is connected between the positive input 210 and the negative output 216. Additionally, the inverter 302A is connected to a power supply 304. As a result, the inverter 302A remains powered on when the power supply 304 is turned on.

The inverters 302B and 302C are also connected between the positive input 210 and the negative output 216 in parallel with the inverter 302A. The inverters 302B and 302C are switchable inverters that are connected by switches 306 to a power supply 304. The switches 306 may be closed or opened to supply power or to remove power from the inverters 302B and 302C. As a result, the inverters 302B and 302C may be powered on or off to implement different tap weights. As seen in FIG. 3, additional switchable inverters 302 may be connected between the positive input 210 and the negative output 216 in parallel with the inverter 302A. These inverters 302 may also be powered on or off to adjust the tap weight provided by the transconductor cell 206.

Additionally, capacitors 308 may be connected to the inputs of the switchable inverters 302B and 302C. For example, the capacitors 308A and 308B may be connected in series with switches 310A and 310B to the input of the inverter 302B. Capacitors 308C and 308D may be connected in series with switches 310C and 310D to the input of the inverter 302C. The capacitors 308A, 308B, 308C, and 308D may match the input capacitance of the inverters 302B and 302C. When the inverters 302B and/or 302C are powered on, their respective capacitors 308A, 308B, 308C, and/or 308D may be disconnected by opening the switches 310A, 310B, 310C, and/or 310D. When the switches 306A and 306B and/or the switches 306C and 306D open to power off the inverters 302B and/or 302C, the switches 310A and 310B and/or the switches 310C and 310D may close to connect the capacitors 308A and 308B and/or the capacitors 308C and 308D to the inputs of the inverters 302B and/or 302C. In this manner, the capacitors 308A and 308B and/or the capacitors 308C and 308D supply the input capacitance of the inverters 302B and/or 302C when the inverters 302B and/or 302C are powered off. As a result, the input and/or output capacitance of the transconductor cell 206 is independent of the tap weight implemented by the transconductor cell 206, and the power consumption or dissipation of the transconductor cell 206 remains proportional to the tap weight provided by the transconductor cell 206.

The transconductor cell 206 includes another network 311 of inverters 302 connected between the negative input 212 and the positive output 214. As seen in FIG. 3, the inverter 302D is connected between the negative input 212 and the positive output 214. Additionally, the inverter 302D is connected to a power supply 304. As a result, the inverter 302D is powered on as long as the power supply 304 is powered on. As a result, the inverters 302A and 302D may implement a minimum tap weight of the transconductor cell 206.

Any number of switchable inverters 302 may be connected between the negative input 212 and the positive output 214. In the example of FIG. 3, the inverters 302E and the inverter 302F are connected between the negative input 212 and the positive output 214. Similar to the inverters 302B and 302C, the inverters 302E and 302F are connected by switches 306 to a power supply 304. The switches 306E and 306F may switch power from the power supply 304 to the inverter 302E. The switches 306G and 306H may switch power from the power supply 304 to the inverter 302F. When the switches 306E, 306F, 306G, and 306H are open, the inverters 302E and 302F may be powered off. When the switches 306E, 306F, 306G, and 306H are closed, the inverters 302E and 302F may be powered on.

Additionally, the capacitors 308E, 308F, 308G, and 308H may be connected in series with the switches 310E, 310F, 310G, and 310H to the inputs of the inverters 302E and 302F. The capacitors 308E, 308F, 308G, and 308H may match the input capacitances of the inverters 302E and 302F. The switches 310E and 310F may close when the switches 306E and 306F are open. The switches 310E and 310F may open when the switches 306E and 306F close. Additionally, the switches 310G and 310H may open when the switches 306G and 306H close. The switches 310G and 310H may close when the switches 306G and 306H open. In this manner, the input and/or output capacitance of the transconductor cell 206 remains independent of the tap weight implemented by the transconductor cell 206, which allows the power consumption of the transconductor cell to be proportional to the tap weight provided by the transconductor cell 206.

Moreover, as seen in FIG. 3, the optical module 104 may include a controller 312 (e.g., within the transconductor cell 206 and/or the equalizer 112). The controller 312 may include circuitry and/or a processor and memory that controls the operation of the transconductor cell 206 and/or other components of the optical module 104. For example, the controller 312 may control the operation of the switches 306 and 310 in the transconductor cell 206 (e.g., by sending control signals to the switches 306). The controller 312 may open or close certain of the switches 306 to adjust the tap weight provided by the transconductor cell 206. The controller 312 may also open or close some of the switches 310 according to the opening or closing of the switches 306 to maintain the input or output capacitance of the transconductor cell 206.

The processor is any electronic circuitry, including, but not limited to one or a combination of microprocessors, microcontrollers, application specific integrated circuits (ASIC), application specific instruction set processor (ASIP), and/or state machines, that communicatively couples to the memory and controls the operation of the optical module 104. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware that operates software to control and process information. The processor executes software stored on the memory to perform any of the functions described herein. The processor controls the operation and administration of the optical module 104 by processing information (e.g., information received from the optical module 104 and the memory). The processor is not limited to a single processing device and may encompass multiple processing devices contained in the same device or computer or distributed across multiple devices or computers. The processor is considered to perform a set of functions or actions if the multiple processing devices collectively perform the set of functions or actions, even if different processing devices perform different functions or actions in the set.

The memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein. The memory is not limited to a single memory and may encompass multiple memories contained in the same device or computer or distributed across multiple devices or computers. The memory is considered to store a set of data, operational software, or information if the multiple memories collectively store the set of data, operational software, or information, even if different memories store different portions of the data, operational software, or information in the set.

Figure 4:
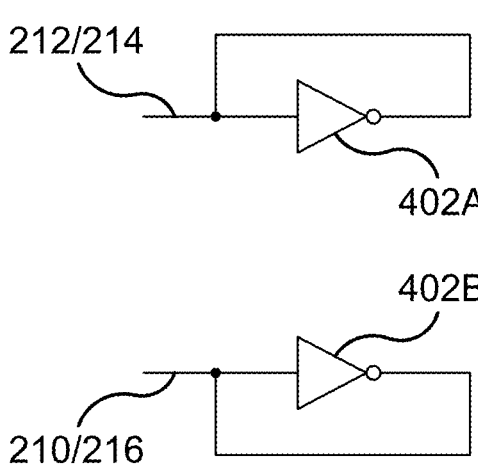
FIG. 4 illustrates an example transimpedance cell of the equalizer of FIG. 2.

FIG. 4 illustrates an example transimpedance cell 207 of the equalizer 112 of FIG. 2. Generally, the transimpedance cell 207, in the example of FIG. 4 may be used as the transimpedance cells 207A and 207B in the equalizer 112. As seen in FIG. 4, the transimpedance cell 207 includes the inverters 402A and 402B. The input of the inverter 402A may be connected to the negative input 212 or the positive output 214. Additionally, the output of the inverter 402A is tied to the input of the inverter 402A. The input of the inverter 402B may be connected to the positive input 210 or the negative output 216. Additionally, the output of the inverter 402B is tied to the input of the inverter 402B. In this manner, the inverters 402A and 402B act as loads providing a matching impedance to the input line 202 and/or the output line 204.

Figure 5:
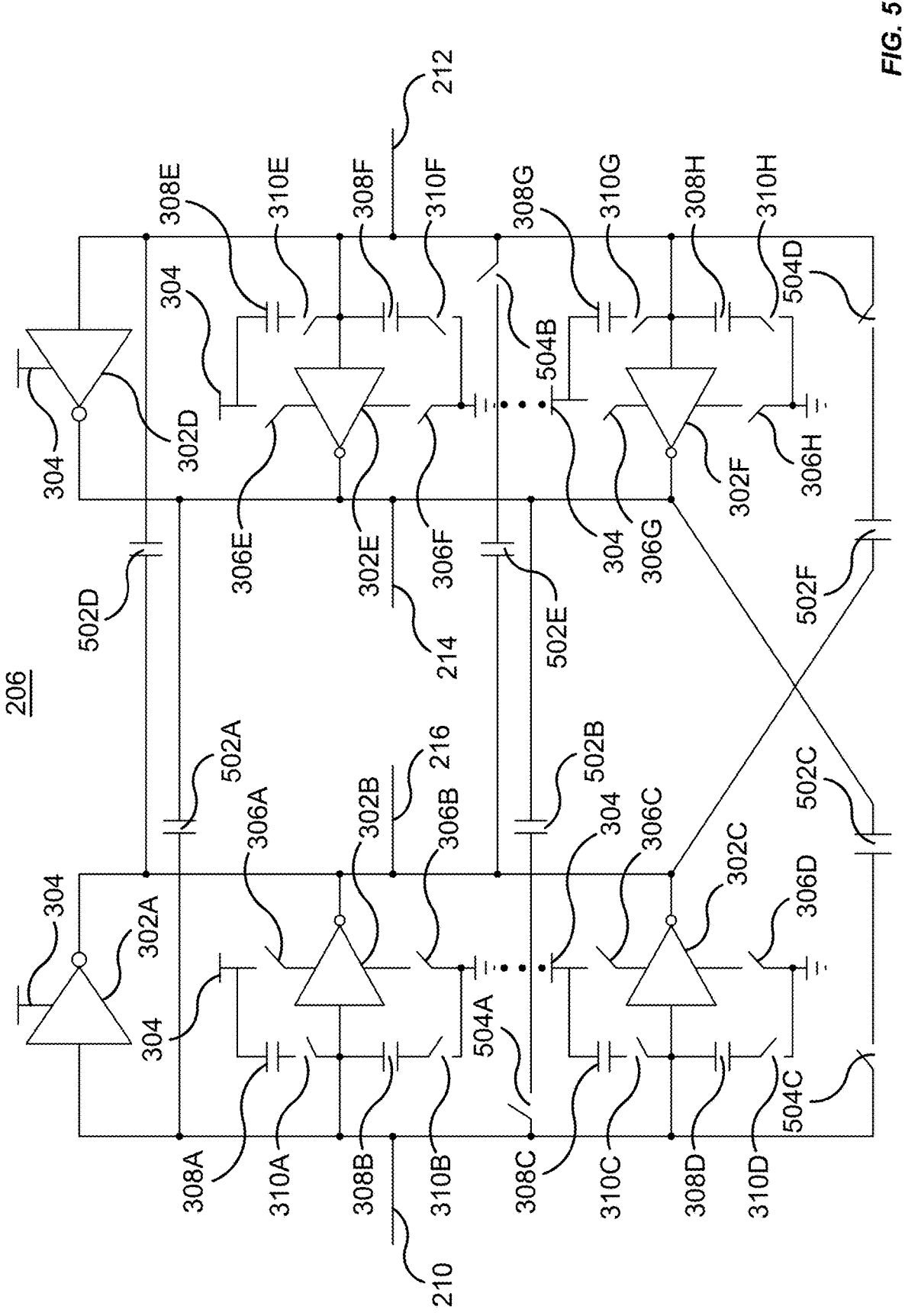
FIG. 5 illustrates an example transconductor cell of the equalizer of FIG. 2.

FIG. 5 illustrates an example transconductor cell 206 of the equalizer 112 of FIG. 2. Generally, the transconductor cell 206 in the example of FIG. 5 is the same as the transconductor cell 206 in the example of FIG. 3, except the transconductor cell 206 in the example of FIG. 5 includes additional capacitors 502 connected between the positive input 210 and the positive output 214 and/or between the negative output 216 and the negative input 212. In particular embodiments, the capacitors 502 cancel a gate capacitance (e.g., the gate to drain capacitance) of the transistors used to implement the inverters 302 in the transconductor cell 206.

The transconductor cell 206 includes a capacitor 502A connected between the positive input 210 and the positive output 214. The transconductor cell 206 also includes a capacitor 502D connected between the negative output 216 and the negative input 212. The capacitor 502A may cancel the gate capacitance of a transistor used to implement the inverter 302A. The capacitor 502D may cancel the gate capacitance of a transistor used to implement the inverter 302D.

The transconductor cell 206 also includes the capacitors 502B and 502E electrically connected between the positive input 210 and the positive output 214 and/or between the negative output 216 and the negative input 212. The capacitor 502B is connected in series with the switch 504A between the positive input 210 and the positive output 214. The capacitor 502E is connected in series with a switch 504B between the negative output 216 and the negative input 212. The switch 504A may copy the operation of the switches 306A and 306B. The switch 504B may copy the operation of the switches 306E and 306F. As a result, the switches 504A and/or 504B may open when the switches 306A and 306B are open and/or when the switches 306E and 306F are open. The switches 504A and/or 504B may close when the switches 306A and 306B and/or when the switches 306E and 306F close. As a result, the capacitors 502B and/or 502E cancel the gate capacitance of the transistors used to implement the inverters 302B and 302E when the inverters 302B and/or 302E are powered on. In some embodiments, the controller 312 controls the opening and closing of the switches 504A and 504B (e.g., by sending control signals to the switches 504A and 504B).

The transconductor cell 206 also includes the capacitors 502C and 502F electrically connected between the positive input 210 and the positive output 214 and/or between the negative output 216 and the negative input 212. The capacitor 502C is connected in series with a switch 504C between the positive input 210 and the positive output 214. The capacitor 502F is connected in series with the switch 504D between the negative output 216 and the negative input 212. The switches 504C and 504D may match the operation of the switches 306C and 306D and the switches 306G and 306H, respectively. When the switches 306C and 306D and/or the switches 306G and 306H open, the switches 504C and/or 504D may open. When the switches 306C and 306D and/or switches 306G and 306H close, the switches 504C and/or 504D close. In this manner, the capacitors 502C and 502F cancel the gate capacitance of the inverters 302C and 302F when the inverters 302C and 302F are powered on. In some embodiments, the controller 312 controls the opening and closing of the switches 504C and 504D (e.g., by sending control signals to the switches 504C and 504D).

Figure 6:
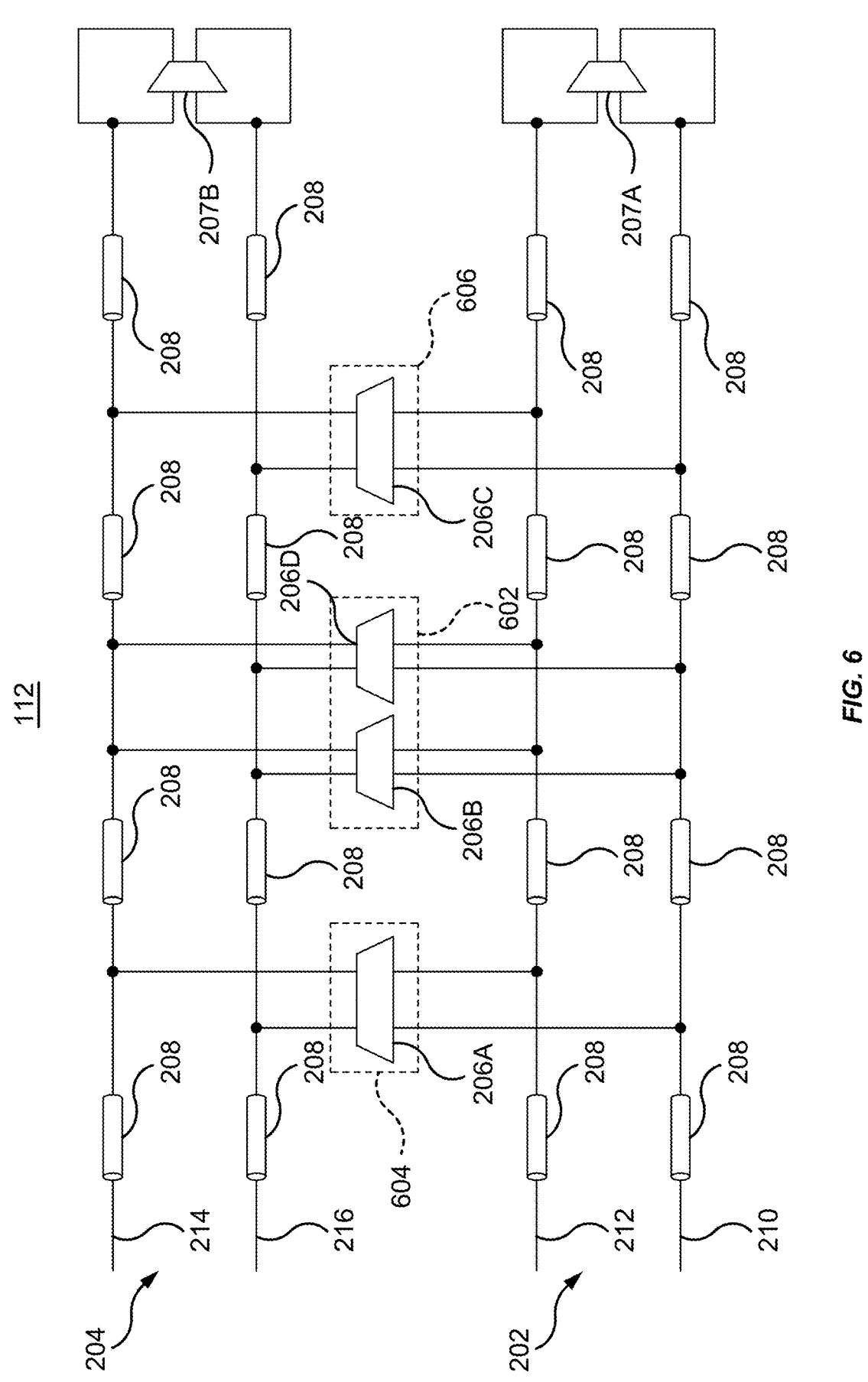
FIG. 6 illustrates an example equalizer in the system of FIG. 1.

FIG. 6 illustrates an example equalizer 112 in the system 100 of FIG. 1. The equalizer 112 in the example of FIG. 6 is the same as the equalizer 112 in the example of FIG. 2, except that the equalizer 112 in the example of FIG. 6 includes additional transconductor cells 206 to implement the main cursor.

As seen in FIG. 6, the equalizer 112 implements the blocks 602, 604, and 606 using transconductor cells 206.

The block 602 may be implemented as the main cursor of the equalizer 112. The block 604 may implement a precursor of the equalizer 112. The block 606 may implement a postcursor of the equalizer 112. Each of the block 602, 604, and 606 may include at least one transconductor cell 206.

The block 602 may include multiple transconductor cells 206. In the example of FIG. 6, the block 602 includes the transconductor cells 206B and 206D. The block 604 includes the transconductor cell 206A. The block 606 includes the transconductor cell 206C. As a result, the main cursor implemented by the block 602 has multiple parallel paths, while the other cursors implemented by the block 604 and 606 have single paths with lower power consumption. In this manner, the equalizer 112 may provide a wide range of tap weights, while saving or reducing power consumption in certain embodiments.

Figure 7:
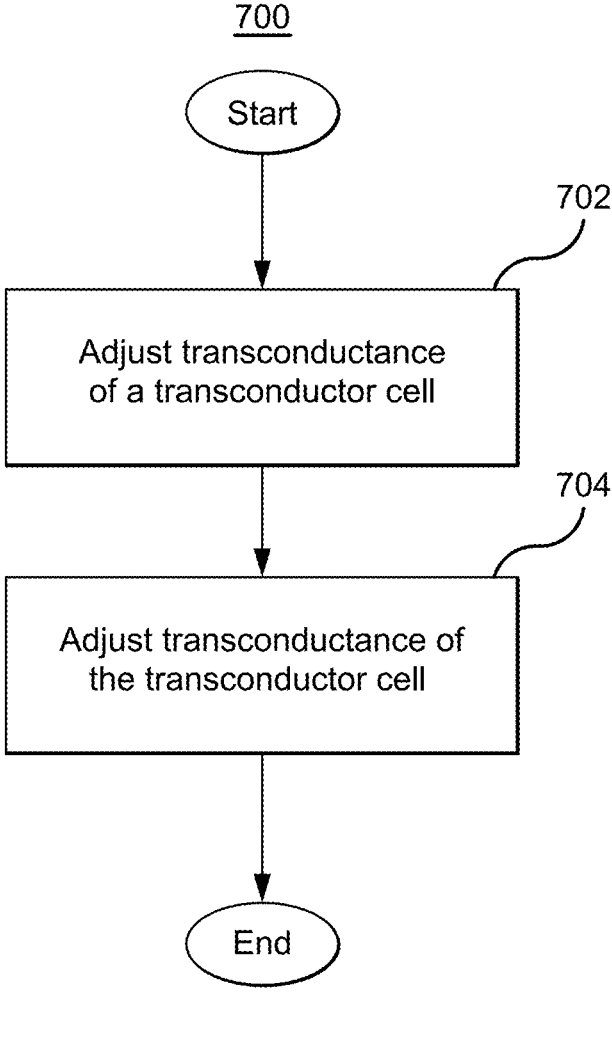
FIG. 7 is a flowchart of an example method performed by the system of FIG. 1.

FIG. 7 is a flowchart of an example method performed by the system 100 of FIG. 1. In certain embodiments, the controller 312 performs the method 700. By performing the method 700, the controller 312 adjusts the tap weights provided by the equalizer 112.

In block 702, the controller 312 adjusts the transconductance of a transconductor cell 206 in the equalizer 112. For example, the controller 312 may close a switch 306 that controls power to an inverter 302 in the transconductor cell 206. By closing the switch 306, the controller 312 powers on the inverter 302. Powering on the inverter 302 changes the transconductance of the transconductor cell 206, which adjusts the tap weight provided by the transconductor cell 206.

In some embodiments, the controller 312 also opens switches 310 that are connected in series with the capacitors 308 connected to the input of the inverter 302. By opening the switches 310, the controller 312 disconnects the capacitors 308, which maintains the input capacitance of the transconductor cell 206 when powering on the inverter 302.

In block 704, the controller 312 adjusts the transconductance of the transconductor cell 206 by opening the switches 306, which powers off the inverter 302. Powering off the inverter 302 adjusts the transconductance of the transconductor cell 206, which adjusts the tap weight provided by the transconductor cell 206. In some embodiments, the controller 312 also closes the switches 310 that are connected in series with the capacitors 308 to the input of the inverter 302. By closing the switches 310, the controller 312 connects the capacitors 308 to the input of the inverter 302, which maintains the input capacitance of the transconductor cell 206, when the inverter 302 is powered off.

In some embodiments, the switches 306 may be opened or closed based on the output of the modulator 116 in the optical module 104. For example, the eye of the output of the modulator 116 may be monitored to determine how to adjust the transconductor cells 206. The switches 306 may then be opened or closed accordingly.

In summary, the equalizer 112 in an LPO module uses switchable inverters 302 to implement transconductor cells 206. Generally, the equalizer 112 implements tap weights using the transconductor cells 206. The equalizer 112 adjusts the tap weight for a transconductor cell 206 by adjusting the transconductance of that transconductor cell 206. To adjust the tap weight, the equalizer 112 opens or closes switches 306 in the transconductor cell 206 to direct power to or away from inverters 302 in the transconductor cell 206, which effectively turns on or off the inverters 302. By controlling which inverters 302 are turned on and off, the equalizer 112 adjusts the transconductance of the transconductor cell 206.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An equalizer comprising:
an input line;
an output line; and
a first transconductor cell comprising:
  a first inverter electrically connected between the input line and the output line;
  a second inverter electrically connected between the input line and the output line;
  a first switch electrically coupled to the second inverter, wherein when the first switch closes, power is provided to the second inverter;
  a capacitor; and
  a second switch electrically connected in series with the capacitor and an input of the second inverter, wherein the second switch opens when the first switch closes.

2. The equalizer of claim 1, wherein closing the first switch adjusts a transconductance of the first transconductor cell.

3. The equalizer of claim 1, wherein:
the input line is a differential input line comprising a positive input and a negative input;

the output line is a differential output line comprising a positive output and a negative output;
the first inverter and the second inverter are electrically connected between the positive input and the negative output; and
the first transconductor cell further comprises:
  a third inverter electrically connected between the negative input and the positive output;
  a fourth inverter electrically connected between the negative input and the positive output; and
  a third switch electrically coupled to the fourth inverter, wherein when the third switch closes, power is provided to the fourth inverter.

4. The equalizer of claim 3, further comprising a transimpedance cell comprising:
a fifth inverter comprising:
  an input electrically connected to the positive input; and
  an output electrically connected to the positive input; and
a sixth inverter comprising:
  an input electrically connected to the negative input; and
  an output electrically connected to the negative input.

5. The equalizer of claim 3, further comprising a transimpedance cell comprising:
a fifth inverter comprising:
  an input electrically connected to the positive output; and
  an output electrically connected to the positive output; and
a sixth inverter comprising:
  an input electrically connected to the negative output; and
  an output electrically connected to the negative output.

6. The equalizer of claim 3, wherein the first transconductor cell further comprises a capacitor electrically connected between the positive input and the positive output.

7. A method comprising:
adjusting a transconductance of a first transconductor cell of an equalizer by closing a first switch electrically coupled to a first inverter of the first transconductor cell to provide power to the first inverter, wherein the first inverter is electrically coupled between an input line and an output line;
adjusting the transconductance of the first transconductor cell by opening the first switch to disconnect power from the first inverter, wherein the first transconductor cell further comprises a second inverter electrically connected between the input line and the output line;
adjusting the transconductance of the first transconductor cell by closing a second switch electrically coupled to a third inverter of the first transconductor cell to provide power to the third inverter, wherein the input line is a differential input line comprising a positive input and a negative input, wherein the output line is a differential output line comprising a positive output and a negative output, wherein the first inverter and the second inverter are electrically connected between the positive input and the negative output, wherein the third inverter is electrically connected between the negative input and the positive output, and wherein the first transconductor cell further comprises a fourth inverter electrically connected between the negative input and the positive output; and adjusting the transconductance of the first transconductor cell by opening the second switch to disconnect power from the third inverter.

8. The method of claim 7, wherein closing the first switch is based on a control signal from a controller.

9. The method of claim 8, further comprising opening a third switch electrically connected in series with a capacitor and an input of the first inverter when the first switch closes.

10. The method of claim 7, wherein the equalizer further comprises a transimpedance cell comprising:
   a fifth inverter comprising:
      an input electrically connected to the positive input; and
      an output electrically connected to the positive input; and
   a sixth inverter comprising:
      an input electrically connected to the negative input; and
      an output electrically connected to the negative input.

11. The method of claim 7, wherein the equalizer further comprises a transimpedance cell comprising:
   a fifth inverter comprising:
      an input electrically connected to the positive output; and
      an output electrically connected to the positive output; and
   a sixth inverter comprising:
      an input electrically connected to the negative output; and
      an output electrically connected to the negative output.

12. The method of claim 7, wherein the first transconductor cell further comprises a capacitor electrically connected between the positive input and the positive output.

13. An equalizer comprising:
   an input line;
   an output line;
   a first block implementing a main cursor of the equalizer, the first block comprising a first transconductor cell and a second transconductor cell, the first transconductor cell comprising:
      a first inverter electrically connected between the input line and the output line;
      a second inverter electrically connected between the input line and the output line; and
      a first switch electrically coupled to the second inverter, wherein when the first switch closes, power is provided to the second inverter;
   the second transconductor cell comprising:
      a third inverter electrically connected between the input line and the output line;
      a fourth inverter electrically connected between the input line and the output line; and
      a second switch electrically coupled to the fourth inverter, wherein when the second switch closes, power is provided to the fourth inverter; and
   a second block implementing at least one of a pre-cursor or a post-cursor, the second block comprising a third transconductor cell comprising:

a fifth inverter electrically connected between the input line and the output line;
      a sixth inverter electrically connected between the input line and the output line; and
      a third switch electrically coupled to the sixth inverter, wherein when the third switch closes, power is provided to the sixth inverter.

14. The equalizer of claim 13, wherein closing the first switch adjusts a transconductance of the first transconductor cell.

15. The equalizer of claim 13, wherein the first transconductor cell further comprises:
   a capacitor; and
   a fourth switch electrically connected in series with the capacitor and an input of the second inverter, wherein the fourth switch opens when the first switch closes.

16. The equalizer of claim 13, wherein:
   the input line is a differential input line comprising a positive input and a negative input;
   the output line is a differential output line comprising a positive output and a negative output;
   the first inverter and the second inverter are electrically connected between the positive input and the negative output; and
   the first transconductor cell further comprises:
      a seventh inverter electrically connected between the negative input and the positive output;
      an eighth inverter electrically connected between the negative input and the positive output; and
      a fourth switch electrically coupled to the eighth inverter, wherein when the fourth switch closes, power is provided to the eighth inverter.

17. The equalizer of claim 16, further comprising a transimpedance cell comprising:
   a ninth inverter comprising:
      an input electrically connected to the positive input; and
      an output electrically connected to the positive input; and
   a tenth inverter comprising:
      an input electrically connected to the negative input; and
      an output electrically connected to the negative input.

18. The equalizer of claim 16, further comprising a transimpedance cell comprising:
   a ninth inverter comprising:
      an input electrically connected to the positive output; and
      an output electrically connected to the positive output; and
   a tenth inverter comprising:
      an input electrically connected to the negative output; and
      an output electrically connected to the negative output.

* * * * *